(12) United States Patent
Boudreau et al.

(10) Patent No.: US 9,092,444 B2
(45) Date of Patent: Jul. 28, 2015

(54) CACHING OF DEEP STRUCTURES FOR EFFICIENT PARSING

(71) Applicant: International Business Machines Corporation, Armonk, NY (US)

(72) Inventors: Michael Boudreau, Orange, CA (US); Brad Moore, Dana Point, CA (US); Ahmed Mousaad, Cairo (EG); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 220 days.

(21) Appl. No.: 13/792,403

(22) Filed: Mar. 11, 2013

(65) Prior Publication Data

US 2014/0258314 A1   Sep. 11, 2014

(51) Int. Cl.
*G06F 17/30* (2006.01)

(52) U.S. Cl.
CPC .............................. *G06F 17/30132* (2013.01)

(58) Field of Classification Search
None
See application file for complete search history.

(56) References Cited

U.S. PATENT DOCUMENTS

| | | | |
|---|---|---|---|
| 2003/0106049 A1 | 6/2003 | Ungar | |
| 2006/0116868 A1 | 6/2006 | Wang | |
| 2009/0204609 A1* | 8/2009 | Labrou et al. | 707/5 |
| 2009/0306961 A1 | 12/2009 | Li et al. | |
| 2010/0324885 A1 | 12/2010 | Shri | |
| 2011/0320498 A1* | 12/2011 | Flor | 707/797 |

* cited by examiner

*Primary Examiner* — Anh Tai Tran
(74) *Attorney, Agent, or Firm* — Schmeiser, Olsen & Watts; John Pivnichny

(57) ABSTRACT

A parsing method and system. The method includes generating an n-gram model of a domain and computing a tf-idf frequency associated with n-grams of the n-gram model. A list including a frequently occurring group of n-grams based on the tf-idf frequency is generated. The frequently occurring group of n-grams is transmitted to a deep parser component and a deep parse output from the deep parser component is generated. The deep parse output is stored within a cache and a processor verifies if a specified text word sequence of the deep parse output is available in the cache.

20 Claims, 4 Drawing Sheets

CACHING OF DEEP STRUCTURES FOR EFFICIENT PARSING

FIELD

One or more embodiments of the invention relate generally to a method for caching deep structures, and in particular to a method and associated system for parsing the cached deep structures.

BACKGROUND

Sorting data includes an inaccurate process with little flexibility. Retrieving sorted data may include a complicated process that may be time consuming and require a large amount of resources. Accordingly, there exists a need in the art to overcome at least some of the deficiencies and limitations described herein above.

SUMMARY

A first embodiment of the invention provides a method comprising: generating, by a computer processor of a computing system, an n-gram model of a domain; computing, by the computer processor, a tf-idf frequency associated with n-grams of the n-gram model; determining, by the computer processor based on the tf-idf frequency, a frequently occurring group of n-grams of the n-grams; generating, by the computer processor, a list comprising the frequently occurring group of n-grams; transmitting, by the computer processor, the frequently occurring group of n-grams to a deep parser component of the computing system; generating, by the computer processor executing the deep parser component with respect to the frequently occurring group of n-grams, a deep parse output comprising results of the executing the deep parser component with respect to the frequently occurring group of n-grams; storing, by a computer processor in a cache, the deep parse output; and verifying, by the computer processor, if a specified text word sequence of the deep parse output is available in the cache.

A second embodiment of the invention provides a computer program product, comprising a computer readable hardware storage device storing a computer readable program code, the computer readable program code comprising an algorithm that when executed by a computer processor of a computer system implements a method, the method comprising: generating, by the computer processor, an n-gram model of a domain; computing, by the computer processor, a tf-idf frequency associated with n-grams of the n-gram model; determining, by the computer processor based on the tf-idf frequency, a frequently occurring group of n-grams of the n-grams; generating, by the computer processor, a list comprising the frequently occurring group of n-grams; transmitting, by the computer processor, the frequently occurring group of n-grams to a deep parser component of the computing system; generating, by the computer processor executing the deep parser component with respect to the frequently occurring group of n-grams, a deep parse output comprising results of the executing the deep parser component with respect to the frequently occurring group of n-grams; storing, by a computer processor in a cache, the deep parse output; and verifying, by the computer processor, if a specified text word sequence of the deep parse output is available in the cache.

A third embodiment of the invention provides a computer system comprising a computer processor coupled to a computer-readable memory unit, the memory unit comprising instructions that when executed by the computer processor implements a method comprising: generating, by the computer processor, an n-gram model of a domain; computing, by the computer processor, a tf-idf frequency associated with n-grams of the n-gram model; determining, by the computer processor based on the tf-idf frequency, a frequently occurring group of n-grams of the n-grams; generating, by the computer processor, a list comprising the frequently occurring group of n-grams; transmitting, by the computer processor, the frequently occurring group of n-grams to a deep parser component of the computing system; generating, by the computer processor executing the deep parser component with respect to the frequently occurring group of n-grams, a deep parse output comprising results of the executing the deep parser component with respect to the frequently occurring group of n-grams; storing, by a computer processor in a cache, the deep parse output; and verifying, by the computer processor, if a specified text word sequence of the deep parse output is available in the cache.

A fourth embodiment of the invention provides a process for supporting computing infrastructure, the process comprising providing at least one support service for at least one of creating, integrating, hosting, maintaining, and deploying computer-readable code in a computer comprising a computer processor, wherein the computer processor executes instructions contained in the code causing the computer to perform a method comprising: generating, by the computer processor, an n-gram model of a domain; computing, by the computer processor, a tf-idf frequency associated with n-grams of the n-gram model; determining, by the computer processor based on the tf-idf frequency, a frequently occurring group of n-grams of the n-grams; generating, by the computer processor, a list comprising the frequently occurring group of n-grams; transmitting, by the computer processor, the frequently occurring group of n-grams to a deep parser component of the computing system; generating, by the computer processor executing the deep parser component with respect to the frequently occurring group of n-grams, a deep parse output comprising results of the executing the deep parser component with respect to the frequently occurring group of n-grams; storing, by a computer processor in a cache, the deep parse output; and verifying, by the computer processor, if a specified text word sequence of the deep parse output is available in the cache.

The present invention advantageously provides a simple method and associated system capable of sorting data.

DETAILED DESCRIPTION

Figure 1:
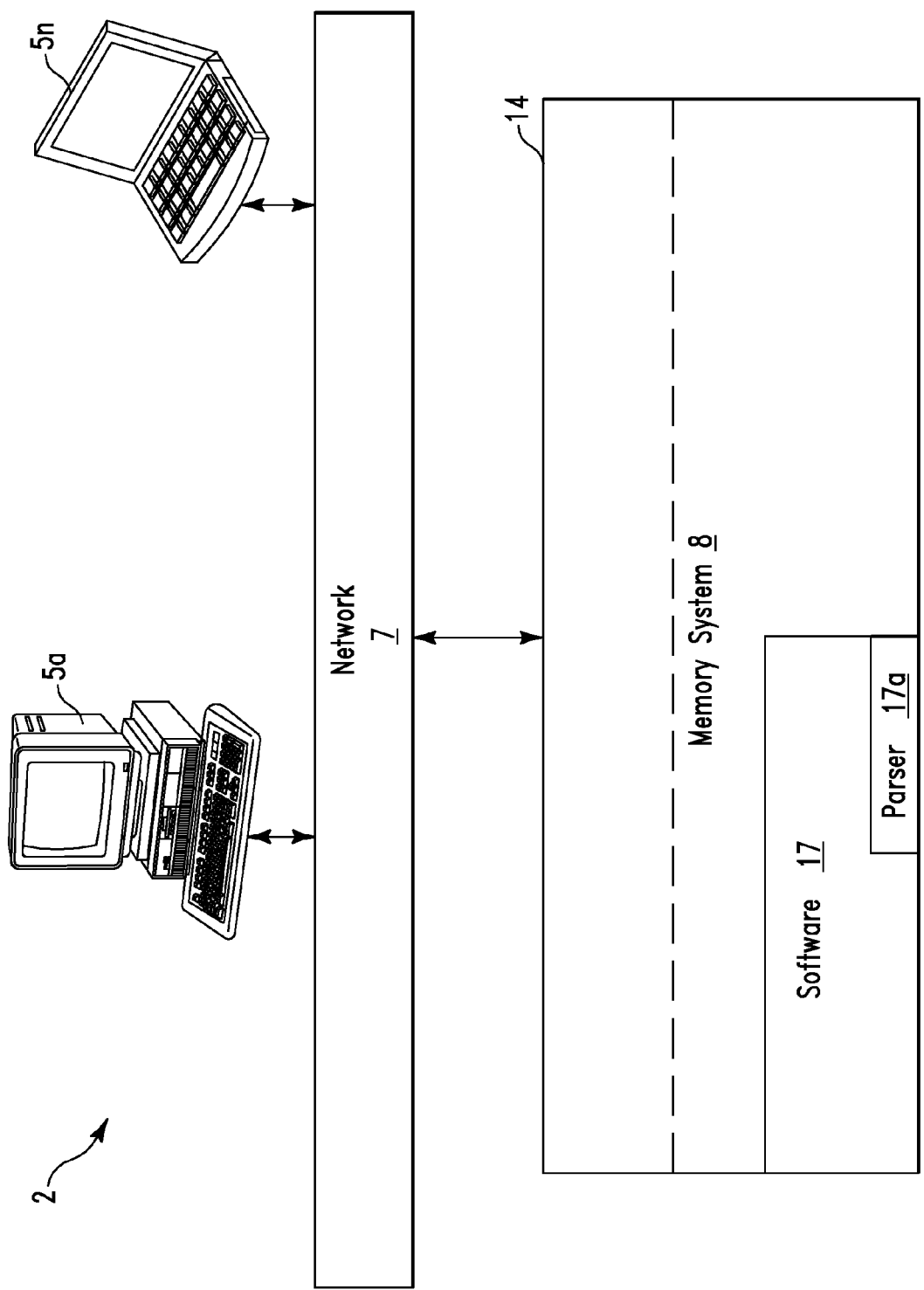
FIG. 1 illustrates a system 2 for caching deep structures enabling an efficient parsing process, in accordance with embodiments of the present invention.

FIG. 1 illustrates a system 2 for caching deep structures enabling an efficient parsing process, in accordance with embodiments of the present invention. System 2 enables a natural language processing (NLP) process. An NLP process is defined herein as a technique for the ingestion and understanding of unstructured data. An NLP process enables an NLP parser to provide deep parsing process. A deep parsing process comprises creating a tree bank (tree structure) for input text.

System 2 of FIG. 1 includes computers 5a . . . 5n connected through a network 7 to a computing system 14. Network 7 may include any type of network including, inter alia, a local area network, (LAN), a wide area network (WAN), the Internet, a wireless network, etc. Computers 5a . . . 5n may include any type of computing system(s) including, inter alia, a computer (PC), a laptop computer, a tablet computer, a server, a PDA, a smart phone, etc. Computing system 14 may include any type of computing system(s) including, inter alia, a computer (PC), a laptop computer, a tablet computer, a server, etc. Computing system 14 includes a memory system 8. Memory system 8 may include a single memory system. Alternatively, memory system 8 may include a plurality of memory systems. Memory system 8 includes software 17 comprising a parser component 17a. Software 17 enables a deep parsing process.

A caching process (enabled by system 2) is driven via an n-gram analysis of a domain. N-gram analysis comprises a form of language modeling that locates token sequences and associated frequencies. For example, system 2 may determine that a sequence such as "the happy dog" or "brown fox" (e.g., a trigram and bigram respectively) are very common within a domain. Once an associated language model has been constructed, system 2 locates the most frequent n-grams and run them through parser component 17a. Results of a deep parse process are stored within a cache (e.g., a database cache, file-backed cache, etc) and indexed by the n-gram. At run time, parser component 17a compares each identified token sequence to the cache contents. If the cache comprises a pre-computed structure, the pre-computed structure will be used by parser component 17a rather than be built at run time. Additionally, system 2 uses a language model to pre-cache variations on frequent n-grams. For example, in a scenario with semantic overlap (e.g., rational software architect), system 2 will select a longest applicable sequence. During a process for modeling a domain (and computing pre-cache structures ahead of time), system 2 may recognize the sequence: "Rational Software Architect" as a common trigram and compute the structure. Additionally, system 2 may recognize the sequence: "Rational Software Architect for Web 8.0.3" as a common 6-gram, and compute a structure for this sequence. Therefore, at run time, if a user types in the sequence: "rational software architect for Web", the sequence is not executed by the cache. The cache may retrieve a structure for the first three tokens of this entity and partially resolve required computational structuring. The entire structure will is not retrievable from the caching mechanism as this entity does not contain the version token: (8.0.3). Additionally, system 2 may to introduce domain-specific variations. For example, if it is determined that retrieved products may include suffixes comprising a version token, the cache may be pre-loaded with a variation of a sequence that does not comprise a token. Using this technique to compute likely variations on pre-computed structures in the cache, system 2 may account for variations in user input in a more precise manner.

Figure 2:
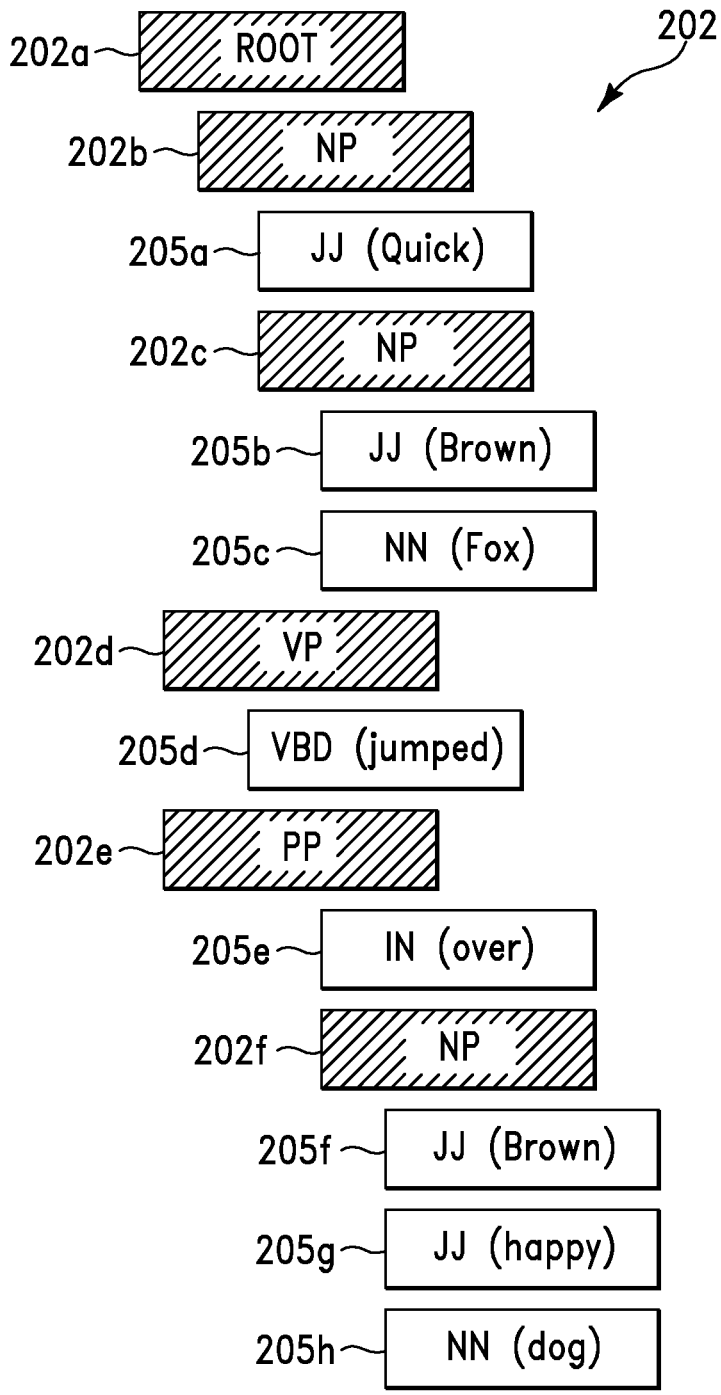
FIG. 2 illustrates a treebank associated with sample input text, in accordance with embodiments of the present invention.

FIG. 2 illustrates a treebank 200 associated with sample input text, in accordance with embodiments of the present invention. The sample input text comprises the sequence: "The Quick Brown Fox jumped over the happy dog". Blocks 202a-202f comprise acronyms indicating phrases (e.g., block 202b comprises NP=Noun Phrase, block 202c comprises VP=Verb Phrase, etc). Blocks 205a-205h comprise actual portions of speech next to each token (e.g., block 205f comprises DT=determiner, block 205g comprises JJ=adjective, block 205h comprises NN=noun). System 2 of FIG. 1 may enable a process to compute high frequency n-grams within a corpus, structure the n-grams, cache the n-grams, and retrieve the n-grams from the cache at run time for application to treebank 200. Use of this process eliminates the need to compute (i.e., by the parser) structures for sequences that occur with high frequency.

Figure 3:
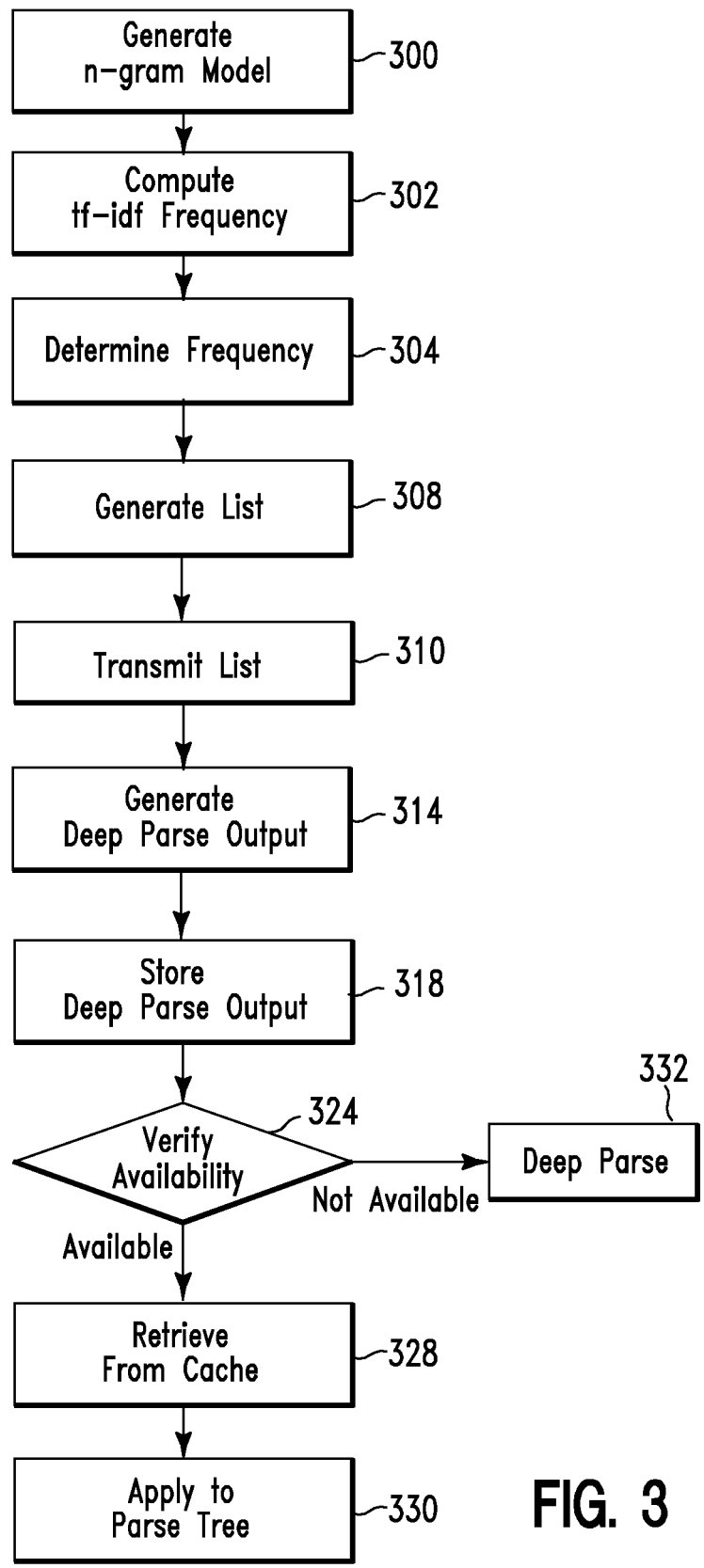
FIG. 3 illustrates an algorithm detailing a process flow enabled by the system of FIG. 1, in accordance with embodiments of the present invention.

FIG. 3 illustrates an algorithm detailing a process flow enabled by system 2 of FIG. 1 for caching of deep structures for an efficient parsing process 2, in accordance with embodiments of the present invention. Each of the steps in the algorithm of FIG. 3 may be enabled and executed by a computer processor executing computer code. In step 300, an n-gram model of a domain is generated. An n-gram model is defined herein as a probabilistic language model for predicting a next item in a sequence and comprising a form of a (n−1) order Markov model. In step 302, a term frequency-inverse document frequency (tf-idf) associated with n-grams of the n-gram model (generated in step 300) is calculated. A tf-idf frequency is defined herein as a numerical statistic reflecting an importance of a word with respect to a document in a collection or corpus. A tf-idf frequency may be used as a weighting factor in information retrieval and text mining. A tf-idf value increases proportionally to a number of times a word appears in a document, but is offset by a frequency of the word in the corpus. Tf-idf comprises a product of two statistics: term frequency and inverse document frequency. Term frequency tf(t,d) may be determined by determining a raw frequency of a term in a document (i.e., a number of times that a term t occurs in a document d. If a raw frequency of t is defined as f(t,d), then term frequency tf(t,d) comprises: tf(t, d)=f(t,d). idf comprises a measure of whether a term is common or rare across all documents. idf may be obtained by dividing a total number of documents by a number of documents comprising a term and then taking the logarithm of the resulting quotient.

In step 304, a frequently occurring group of n-grams (of the n-grams of step 302) is determined based on the tf-idf frequency. In step 308, a list comprising the frequently occurring group of n-grams is generated. In step 310, the frequently occurring group of n-grams is transmitted to a deep parser component of a computing system. In step 314, a deep parse output is generated. The deep parse output comprises results of executing deep parser component with respect to the frequently occurring group of n-grams. In step 318, the deep parse output is stored. In step 324, it is verified if a specified text word sequence of the deep parse output is available in the cache. If in step 324, it is verified that a specified text word sequence of the deep parse output is available in the cache then in step 328, the specified text word sequence is retrieved from the cache and in step 330, the specified text word sequence is applied to a parse tree. If in step 324, it is verified that a specified text word sequence of the deep parse output is not available in the cache then in step 332, the specified text word sequence is deep parsed.

Figure 4:
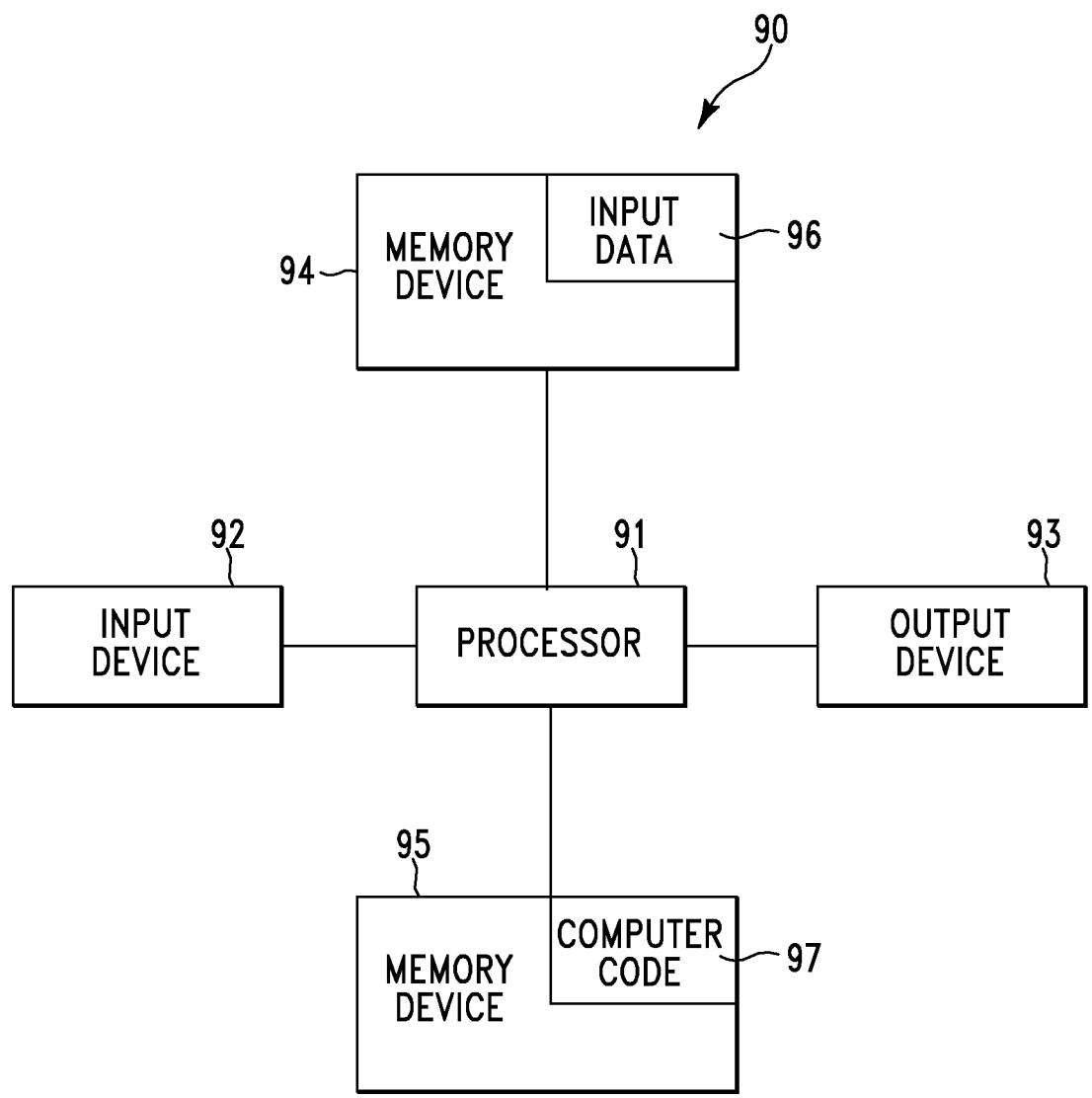
FIG. 4 illustrates a computer apparatus used by the system of FIG. 1 for caching deep structures enabling an efficient parsing process, in accordance with embodiments of the present invention.

FIG. 4 illustrates a computer apparatus 90 (e.g., computing system 14 of FIG. 1) used by system 2 of FIG. 1 for caching deep structures enabling an efficient parsing process, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 3) for caching deep structures enabling an efficient parsing process. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may include the algorithm of FIG. 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to cache deep structures enabling an efficient parsing process. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for caching deep structures enabling an efficient parsing process. In another embodiment, the invention provides a business method that performs the process steps of the invention on a subscription, advertising, and/or fee basis. That is, a service supplier, such as a Solution Integrator, could offer to cache deep structures enabling an efficient parsing process. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method comprising:
   generating, by a computer processor of a computing system, an n-gram model of a domain;
   computing, by said computer processor, a term frequency-inverse document frequency (tf-idf) associated with n-grams of said n-gram model;
   determining, by said computer processor based on said tf-idf, a frequently occurring group of n-grams of said n-grams;
   generating, by said computer processor, a list comprising said frequently occurring group of n-grams;
   transmitting, by said computer processor, said frequently occurring group of n-grams to a deep parser component of said computing system;
   generating, by said computer processor executing said deep parser component with respect to said frequently occurring group of n-grams, a deep parse output comprising results of said executing said deep parser component with respect to said frequently occurring group of n-grams;
   storing, by said computer processor in a database cache, said deep parse output;
   indexing, by said computer processor executing said frequently occurring group of n-grams in said database cache, said deep parse output; and
   verifying, by said computer processor, if a pre-computed specified text word sequence of said deep parse output is available in said database cache, wherein said verifying comprises:
      retrieving from said deep parse output, a plurality of tokens of said deep parser output, wherein said plurality of tokens are associated with a portion of said pre-computed specified text word sequence, wherein said plurality of tokens comprise suffixes associated with structures of said deep parser output, and wherein said plurality of tokens comprise a version token; and
      determining based on said plurality of tokens, variations associated with said pre-computed specified text word sequence.

2. The method of claim 1, wherein results of said verifying indicate that said specified text word sequence is available in said database cache, and wherein said method further comprises:
   retrieving, by said computer processor from said database cache, said specified text word sequence; and
   applying, by said computer processor, said specified text word sequence to a parse tree.

3. The method of claim 1, wherein results of said verifying indicate that said specified text word sequence is not available in said database cache, and wherein said method further comprises:
   deep parsing, by said computer processor, said specified text word sequence.

4. The method of claim 1, wherein each n-gram of said frequently occurring group of n-grams comprises a cache key.

5. The method of claim 1, wherein said deep parse output comprises a cache value.

6. A computer program product, comprising a computer readable hardware storage device storing a computer readable program code, said computer readable program code comprising an algorithm that when executed by a computer processor of a computer system implements a method, said method comprising:
   generating, by said computer processor, an n-gram model of a domain;
   computing, by said computer processor, a term frequency-inverse document frequency (tf-idf) associated with n-grams of said n-gram model;
   determining, by said computer processor based on said tf-idf, a frequently occurring group of n-grams of said n-grams;

generating, by said computer processor, a list comprising said frequently occurring group of n-grams;
transmitting, by said computer processor, said frequently occurring group of n-grams to a deep parser component of said computing system;
generating, by said computer processor executing said deep parser component with respect to said frequently occurring group of n-grams, a deep parse output comprising results of said executing said deep parser component with respect to said frequently occurring group of n-grams;
storing, by said computer processor in a database cache, said deep parse output;
indexing, by said computer processor executing said frequently occurring group of n-grams in said database cache, said deep parse output; and
verifying, by said computer processor, if a pre-computed specified text word sequence of said deep parse output is available in said database cache, wherein said verifying comprises:
retrieving from said deep parse output, a plurality of tokens of said deep parser output, wherein said plurality of tokens are associated with a portion of said pre-computed specified text word sequence, wherein said plurality of tokens comprise suffixes associated with structures of said deep parser output, and wherein said plurality of tokens comprise a version token; and
determining based on said plurality of tokens, variations associated with said pre-computed specified text word sequence.

7. The computer program product of claim 6, wherein results of said verifying indicate that said specified text word sequence is available in said cache, and wherein said method further comprises:
retrieving, by said computer processor from said cache, said specified text word sequence; and
applying, by said computer processor, said specified text word sequence to a parse tree.

8. The computer program product of claim 6, wherein results of said verifying indicate that said specified text word sequence is not available in said cache, and wherein said method further comprises:
deep parsing, by said computer processor, said specified text word sequence.

9. The computer program product of claim 6, wherein each n-gram of said frequently occurring group of n-grams comprises a cache key.

10. The computer program product of claim 6, wherein deep parse output comprises a cache value.

11. A computer system comprising a computer processor coupled to a computer-readable memory unit, said memory unit comprising instructions that when executed by the computer processor implements a method comprising:
generating, by said computer processor, an n-gram model of a domain;
computing, by said computer processor, a term frequency-inverse document frequency (tf-idf) associated with n-grams of said n-gram model;
determining, by said computer processor based on said tf-idf, a frequently occurring group of n-grams of said n-grams;
generating, by said computer processor, a list comprising said frequently occurring group of n-grams;
transmitting, by said computer processor, said frequently occurring group of n-grams to a deep parser component of said computing system;
generating, by said computer processor executing said deep parser component with respect to said frequently occurring group of n-grams, a deep parse output comprising results of said executing said deep parser component with respect to said frequently occurring group of n-grams;
storing, by said computer processor in a database cache, said deep parse output;
indexing, by said computer processor executing said frequently occurring group of n-grams in said database cache, said deep parse output; and
verifying, by said computer processor, if a pre-computed specified text word sequence of said deep parse output is available in said database cache, wherein said verifying comprises:
retrieving from said deep parse output, a plurality of tokens of said deep parser output, wherein said plurality of tokens are associated with a portion of said pre-computed specified text word sequence, wherein said plurality of tokens comprise suffixes associated with structures of said deep parser output, and wherein said plurality of tokens comprise a version token; and
determining based on said plurality of tokens, variations associated with said pre-computed specified text word sequence.

12. The computer system of claim 11, wherein results of said verifying indicate that said specified text word sequence is available in said cache, and wherein said method further comprises:
retrieving, by said computer processor from said cache, said specified text word sequence; and
applying, by said computer processor, said specified text word sequence to a parse tree.

13. The computer system of claim 11, wherein results of said verifying indicate that said specified text word sequence is not available in said cache, and wherein said method further comprises:
deep parsing, by said computer processor, said specified text word sequence.

14. The computer system of claim 11, wherein each n-gram of said frequently occurring group of n-grams comprises a cache key.

15. The computer system of claim 11, wherein deep parse output comprises a cache value.

16. A process for supporting computing infrastructure, the process comprising providing at least one support service for at least one of creating, integrating, hosting, maintaining, and deploying computer-readable code in a computer comprising a computer processor, wherein the computer processor executes instructions contained in the code causing the computer to perform a method comprising:
generating, by said computer processor, an n-gram model of a domain;
computing, by said computer processor, a term frequency-inverse document frequency (tf-idf) associated with n-grams of said n-gram model;
determining, by said computer processor based on said tf-idf, a frequently occurring group of n-grams of said n-grams;
generating, by said computer processor, a list comprising said frequently occurring group of n-grams;
transmitting, by said computer processor, said frequently occurring group of n-grams to a deep parser component of said computing system;
generating, by said computer processor executing said deep parser component with respect to said frequently occurring group of n-grams, a deep parse output comprising results of said executing said deep parser component with respect to said frequently occurring group of n-grams;

storing, by said computer processor in a database cache, said deep parse output;

indexing, by said computer processor executing said frequently occurring group of n-grams in said database cache, said deep parse output; and verifying, by said computer processor, if a pre-computed specified text word sequence of said deep parse output is available in said database cache, wherein said verifying comprises:

retrieving from said deep parse output, a plurality of tokens of said deep parser output, wherein said plurality of tokens are associated with a portion of said pre-computed specified text word sequence, wherein said plurality of tokens comprise suffixes associated with structures of said deep parser output, and wherein said plurality of tokens comprise a version token; and determining based on said plurality of tokens, variations associated with said pre-computed specified text word sequence.

17. The process of claim 16, wherein results of said verifying indicate that said specified text word sequence is available in said cache, and wherein said method further comprises:

retrieving, by said computer processor from said cache, said specified text word sequence; and applying, by said computer processor, said specified text word sequence to a parse tree.

18. The process of claim 16, wherein results of said verifying indicate that said specified text word sequence is not available in said cache, and wherein said method further comprises:

deep parsing, by said computer processor, said specified text word sequence.

19. The process of claim 16, wherein each n-gram of said frequently occurring group of n-grams comprises a cache key.

20. The process of claim 16, wherein deep parse output comprises a cache value.

* * * * *